May 6, 1941. M. M. HURD 2,240,931
VIEW FINDER FOR AERIAL CAMERAS
Filed Jan. 23, 1939
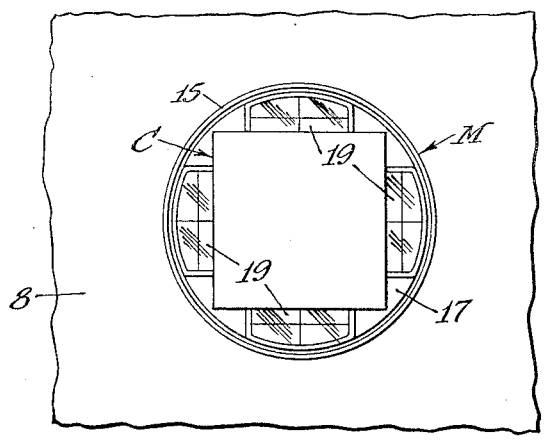
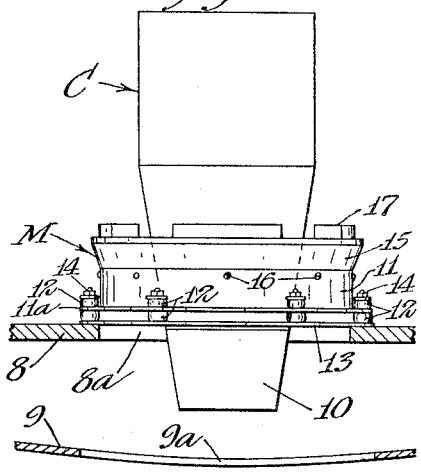
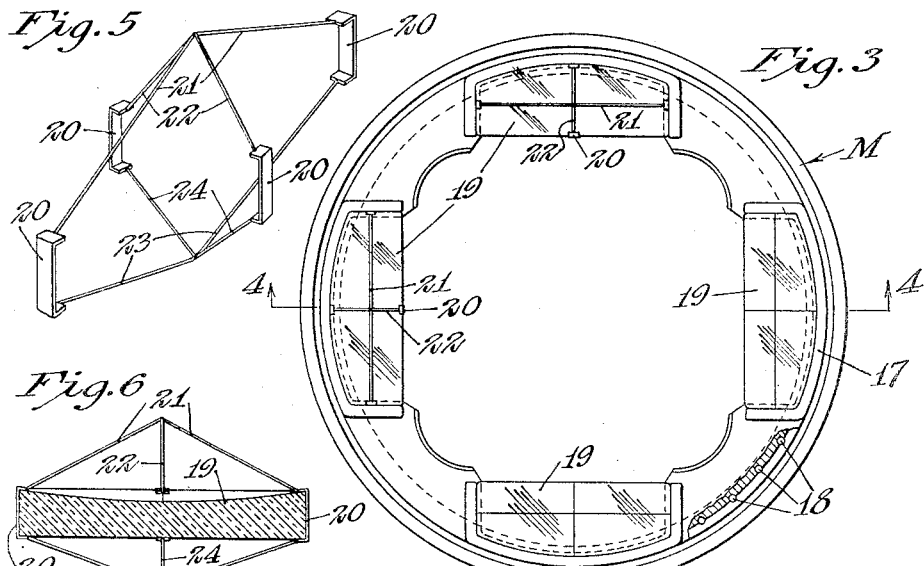
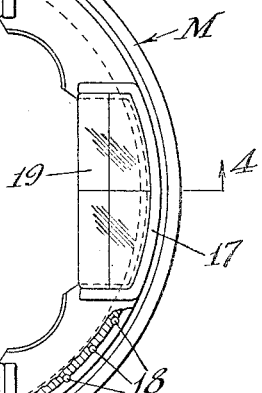
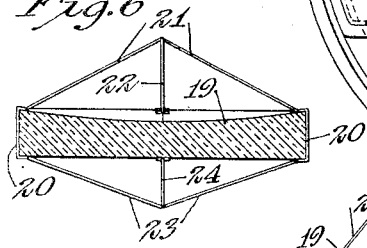
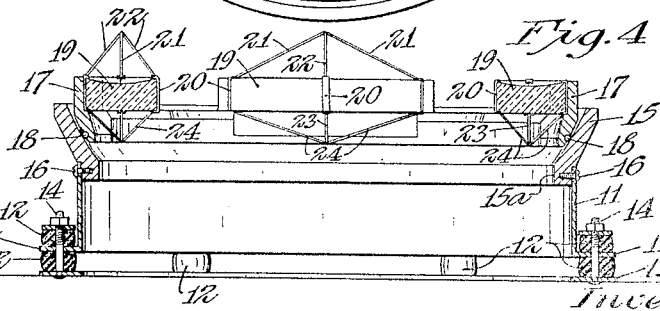
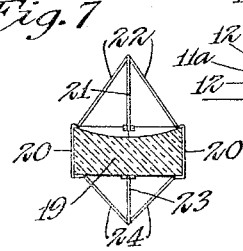
Inventor
Mark M. Hurd
By Williamson & Williamson
Attorneys Patented May 6, 1941

2,240,931

UNITED STATES PATENT OFFICE 2,240,931

VIEW FINDER FOR AERIAL CAMERAS

Mark M. Hurd, Minneapolis, Minn., assignor to Mark Hurd Manufacturing Corporation, Minneapolis, Minn., a corporation of Minnesota Application January 23, 1939, Serial No. 252,385

6 Claims. (Cl. 95—12.5)

My invention relates to photographic apparatus and particularly to view-finders for aerial cameras.

In aerial photography such as for map-making purposes it is not only necessary that the camera always be leveled so that the lens axis is vertically disposed if accurate maps are to be obtained, but it is also highly desirable, from the standpoint of efficiency and convenience, that the camera be so adjusted rotatively about the lens axis thereof that the lines representing the boundaries of a rectangular area of film in position to be exposed be disposed parallel to the natural co-ordinates of the land areas to be photographed, as, for example, roads extending in respective directions at right angles to each other. If the airplane in which the aerial camera is being carried is following a track parallel to one of the roads mentioned above and a cross wind condition exists, the longitudinal axis of the airplane will be disposed at an angle to the track being followed and this angle will vary in proportion to the relation of the wind velocity to the air speed of the airplane. Also, during a run, the direction or the velocity of the wind is likely to vary and the angle mentioned will vary in accordance. The angle between a selected boundary of the film and the longitudinal axis of the airplane must at all times be maintained such that the selected film boundary line will be parallel to the track of the airplane regardless of how the angle between the longitudinal axis and the track of the airplane may vary. It should be apparent that the camera must be frequently re-adjusted in position relative to the airplane not only because of changing wind conditions, but also because an airplane cannot be so accurately operated as to maintain a fixed direction of its longitudinal axis throughout a substantial period of time. At the present time, with some kinds of aerial cameras, it is customary to adjust and re-adjust the position of the camera in accordance with observations taken by means of a view-finding device separate from and independent of the camera. This type of view-finding device is first adjusted in position and a reading is taken from a scale included therein. The camera is then rotatively adjusted to obtain a setting thereof corresponding to the reading and is leveled in accordance with observations of spirit levels mounted on the camera or the camera mounting. Such methods of properly positioning a camera are inconvenient and consume considerable time. Also the conditions for which the separate view-finder has been set may change before the camera-positioning operation has been completed and an exposure has been made.

It is a general object of my invention to provide camera-pointing guide means which may be quickly and conveniently used in setting the position of a camera and which may be kept under observation during operation of the camera in making an exposure.

A more specific object is to provide visual sighting means for a camera enabling pointing of the camera in much the same manner as a gun is pointed by use of the sights thereof.

Another object is to provide one or more view-finding lenses on the adjustable mounting for a camera with the axes of such lenses disposed parallel to the lens axis of the camera carried by the mounting.

Still another object is to provide such a device wherein the lenses are of a type known as negative lenses so that the angle of view afforded thereby is similar to the angle of view of the camera when the eyes of the user are at a suitable distance from the device.

Yet another object is to provide such a device including a pair of sighting elements associated with the view-finding lens and both situated on the optical axis thereof in spaced relation with each other so that a user of the device may sight past said elements to locate the point on the ground which is at the center of the field of view of the camera.

A further object is to provide such a device of simple, light, compact and inexpensive construction.

These and other objects and advantages of the invention will more fully appear from the following description made in connection with the accompanying drawing, wherein like reference characters refer to the same parts throughout the views, and in which:

Fig. 1 is a top view of a portion of the floor of an airplane fuselage carrying a camera mounting and camera with which an embodiment of my invention is associated;

Fig. 2 is a side view of the structure illustrated in Fig. 1;

Fig. 3 is a top view of the camera mounting of Fig. 1;

Fig. 4 is a sectional view taken along the line 4—4 of Fig. 3 as indicated by the arrows;

Fig. 5 is a perspective view of sighting means associated with the view-finding lenses of my device;

Fig. 6 is a longitudinal sectional view of one of the lenses of my device with the sighting means of Fig. 5 associated therewith, and Fig. 7 is a cross sectional view of the lens and associated sighting means of Fig. 6.

Referring to the drawing, the numerals 8 and 9 refer to the floor and the belly covering of an airplane respectively. The floor 8 and covering 9 are provided with respective vertically aligned apertures 8a and 9a to function as a downwardly facing window above which a camera may be mounted and through which land below the airplane may be viewed by the camera.

A camera mounting M carrying a camera C is secured to the floor 8 in such position that the lens cone 10 of the camera C projects downwardly through the aperture 8a in generally centered relation therewith. The mounting M includes a sleeve 11 of large diameter relative to its length and having an outwardly projecting flange 11a formed at the lower edge thereof and provided with apertures at respective circumferentially spaced points. A pair of elastic, compressible, axially apertured cylindrical shock-absorbing elements 12 are placed respectively above and below each of the apertured portions of the flange 11a. A flat annular member 13 encircling the aperture 8a is secured to the upper side of the floor 8 by any suitable means. The member 13 is apertured to receive a series of bolts 14 which extend through aligned apertures of the member 13, the elements 12 and the flange 11a to secure the sleeve 11 to the annular member 13.

An annular race member or outer ring 15 having an inner peripheral surface of an upwardly divergent partial spherical shape is mounted on the upper end of the sleeve 11. The lower edge of the race member 15 is provided with a downwardly projecting annular projection 15a which is telescoped into the upper end of the sleeve 11 and is secured therein by suitable means such as the screws which project inwardly through suitably located apertures in the upper marginal portion of the sleeve 11 and are screw-threadedly received in suitably located internally screw-threaded apertured portions of the projection 15a.

A centrally apertured circular body or inner ring 17, of which the lower portion of the exterior peripheral surface is shaped complementary to the interior peripheral shape of the race member 15, is set in the race member 15 so as to be supported thereby and yet be rotatable and tiltable relative thereto. The body 17 is provided, in the portion of the periphery thereof working in the race member 15, with a multiplicity of ball bearings 16 rotatably carried in suitable recesses in the periphery of the body 17 for rolling engagement with the race member 15.

The camera C is fixedly mounted on the body 17 by any suitable means so as to be rotatable about its lens axis and tiltable relative to the race member 15 with the body 17. The lens cone of the camera C projects downwardly through the central aperture of the body 17.

All of the above described structure is of conventional design and a description of an embodiment of my invention associated therewith follows.

In four respective quadrants thereof the body 17 is apertured to receive my view-finding lenses which are preferably but not necessarily of generally rectangular shape. One of my lenses 19 is secured in each of the above mentioned apertured portions of the body 17 with the optical axes of the lenses 19 positioned to be disposed parallel to the optical axis of the lens of a camera C carried by the body 17 in the normal position relative thereto. A view through each of my lenses 19 of the ground below is afforded through the aperture of the body 17 accommodating the lens, the interior of the sleeve 11 and the apertures 8a and 9a. While my lenses are of generally rectangular shape the sides thereof toward the periphery of the body are curved somewhat, as shown, to conform approximately with the curvature of a circle extending along said sides and having a center common with the center of the body 17.

My lenses 19 are of the type known as a negative lens and which is exemplified by the plano-concave lens shape illustrated in Figs. 7 and 6. This type of lens is employed so that the area which may be viewed through the lens 19 will be substantially the area viewed by the camera C when the eyes of the user are situated at a suitable distance above the lens 19.

Each of my lenses 19 is provided with sighting means whereby a sight may be taken along the optical axis of the lens to locate the point on the ground below constituting the center of the area viewed by the camera C. One form which my sighting means may take is illustrated in detail to an enlarged scale in Figs. 5, 6 and 7. Before the lenses 19 are placed in the apertures provided for them in the body 17 clips 20 are placed on each of the four sides of the lens. The clips 20 may consist of strips of metal bent at right-angles at each end so that the bent end portions of each clip may engage respectively the top and bottom sides of the lens 19 while the medial portion of the clip 20 extends across the edge or side surface of the lens 19 from the top to the bottom of the lens 19. With the clips 20 in place on the lens 19, the lens may be placed in the aperture provided therefor in the body 17. Above the lens 19 a wire 21 is soldered or otherwise secured to the upper ends of the clips 20 disposed at respective ends of the lens 19. Another wire 22 is secured at its respective ends to the upper ends of clips 20 situated at longitudinal edges of the lens 19. The wires 21 and 22 are pulled upwardly at their centers to intersect in the manner of cross hairs at a point above the lens 19 and on the axis of the lens 19. In a similar manner wires 23 and 24 are secured to the bottom ends of the clips 20 and are pulled downwardly to intersect at their centers at a point below the lens 19 and on the axis of the lens 19. It should be apparent that a user of the device may sight again the optical axis of the lens 19 by so positioning the wire that the intersections of the wires respectively above and below the lens 19 coincide as seen by the user. With the user's eye in such position a point on the ground below which is aligned with the two intersections of the sighting cross wires will represent the center of the area viewed by the camera C. In cases where the utmost accuracy is not necessary either the upper or lower pair of crossed wires may be omitted and crossed lines formed on the corresponding face of the lens 19, as by etching, may be substituted therefor as indicated in connection with the right-hand lens of Fig. 4. If still less accuracy is required, the two pairs of cross wires could be replaced by pairs of crossed lines placed respectively on the upper and lower sides of the lens 19. In all cases where a pair of crossed lines is placed on the lens for sighting means, the intersection of the respective lines of each pair thereof would, of course, be situated at the optical axis of the lens 19, and the lines would be disposed parallel to respective edges of a rectangular area of film positioned in the camera C for exposure.

In use of my combination of a camera, camera mounting, viewing lenses and sighting elements the operator of the camera may sight through any one of the lenses 19 and, where one or more pairs of cross wires are used, may adjust the position of the camera so that the crossed wires are parallel to natural coordinates of the area being photographed such as, for example, intersecting roads or the like. The sighting points formed by the intersections of the two pairs of wires are aligned with a point on the ground directly below the camera at all times when the camera is properly leveled. Obviously, in operating the camera to make an exposure, the operator may readjust the position of the camera as the airplane may swing this way or that so as to maintain the camera in proper position both preceding and during the process of making an exposure. The camera may be aimed in much the same manner as a gun. It should be apparent that the camera may be properly positioned quite rapidly and conveniently and may be easily maintained in proper position during the process of making an exposure. The customary procedure of using a separate view finder and sighting the camera in accordance with a reading taken on the dial of the separate view finding apparatus is eliminated entirely and the camera pointing operation is direct and rapid. Spirit levels on the camera or its mounting are ordinarily used in conjunction with my view finding device for the purpose of leveling the camera.

My view finding device is particularly useful in checking the track of a camera-equipped airplane and in taking observations for determining the proper time interval at which to take suitably overlapping pictures.

The availability of four view-finding lenses in my device enables observations to be made of areas not only directly below but also ahead, behind or to either side of the camera-equipped airplane by using such one of the four lenses that the camera cone will not obstruct view through the lens of the area to be observed.

It is apparent that I have invented an improved type of view-finding and aiming apparatus for aerial cameras which enables particularly rapid and accurate sighting of the camera, and also enables constant readjustment of the camera position to compensate for changes in conditions occurring during the process of taking a picture.

It will, of course, be understood that various changes may be made in the form, details, proportions and arrangement of the parts without departing from the scope of my invention.

What is claimed is :

1. View finding apparatus for a camera mounted on a member which is tiltable and also rotatable about the lens axis of said camera comprising, a lens supported from said member with its optical axis parallel to the lens axis of said camera and being so situated that vision therethrough to the scene viewed by the camera is unobstructed, a pair of relatively thin elongated elements associated with one face of said lens and supported at their ends from said member, said elements being so positioned and so arched away from said lens as to intersect at a point on the optical axis of said lens spaced from said lens, and structure providing a sighting point on said optical axis spaced from the intersection of said wires.

2. View finding apparatus for a camera mounted on a member which is tiltable and also rotatable about the lens axis of said camera comprising, a lens supported from said member with its optical axis parallel to the lens axis of said camera and being so situated that vision therethrough to the scene viewed by the camera is unobstructed, two pairs of relatively thin elongated elements associated with respective faces of said lens and supported from their ends from said member, said elements being so positioned and so arched away from said lens that the respective elements of each of said pairs intersect at a point on said optical axis spaced outwardly of the corresponding face of said lens whereby the two intersections so formed constitute widely spaced sighting points on said optical axis.

3. A combined flexible mounting and view finder for an aerial camera comprising, a ring-shaped base adapted to be secured to the floor of an airplane in registration with an aperture through said floor, a member carried by said base in registration with the central space thereof and with freedom for limited rotational and tilting adjustive movements relative thereto, said member being arranged for rigid mounting of a downwardly directed camera thereon in a predetermined position relative thereto and being apertured for visual communication between a camera mounted thereon and a scene therebelow, and a viewfinder lens fixedly mounted on said member in such relation thereto that the axis of said lens will be parallel to the lens axis of a camera mounted on said member, said member having an aperture therethrough registering with said lens.

4. A combined flexible mounting and view finder for an aerial camera comprising, a ring-shaped base adapted to be secured to the floor of an airplane in registration with an aperture in said floor, a member carried by said base in registration with the central space thereof and with freedom for limited rotational and tilting adjustive movements relative thereto, said member being arranged for rigid mounting of a downwardly directed camera thereon in a predetermined position relative thereto and being centrally apertured for visual communication between a camera mounted thereon and a scene therebelow, and a plurality of viewfinder lenses fixedly mounted on said member at respective sides of the position of a camera mounted thereon, said lenses being positioned with their axes parallel to the position of the lens axis of a camera mounted on said member, said member having apertures therein registering with said respective lenses.

5. A combined flexible mounting and view finder for an aerial camera comprising, a ring-shaped base adapted to be secured to the floor of an airplane in registration with an aperture through said floor, a ring-shaped camera-carrying member supported by and partially within said base with freedom for limited rotational and tilting adjustive movements relative thereto, said member being arranged for rigid mounting of a downwardly directed camera therein with the lens axis of the camera parallel to the axis of said member, and a viewfinder lens mounted on said member with its axis parallel to the axis thereof, said member having an aperture therethrough registering with said viewfinder lens.

6. View finding apparatus for an aerial camera which is normally pointed downwardly comprising, an annular mounting member tiltably mounted and also rotatable about a general vertical axis, said mounting member having means for also mounting said camera with the lens of said camera disposed substantially axially of said member and below the same, the periphery of said camera being considerably less than the external periphery of said member, said member being apertured outside of its connection with said camera, and a lens mounted in said apertured portion with its axis parallel to the lens axis of said camera and so situated on said member that vision therethrough to the scene viewed by said camera is unobstructed.

MARK M. HURD.